Aug. 11, 1964     R. V. NESS     3,144,004
INSECTICIDE APPLICATOR FOR ANIMALS
Filed June 21, 1962     2 Sheets-Sheet 1

INVENTOR.
ROYAL V. NESS
BY Gary D. Fields
ATTORNEY

Aug. 11, 1964   R. V. NESS   3,144,004
INSECTICIDE APPLICATOR FOR ANIMALS
Filed June 21, 1962   2 Sheets-Sheet 2

INVENTOR.
ROYAL V. NESS
BY *Gary D Fields*
ATTORNEY

United States Patent Office 3,144,004
Patented Aug. 11, 1964

3,144,004
INSECTICIDE APPLICATOR FOR ANIMALS
Royal V. Ness, 1519 Westminster Place,
Westminster, Colo.
Filed June 21, 1962, Ser. No. 204,199
10 Claims. (Cl. 119—157)

This invention relates to an applicator, and more particularly to an insecticide applicator for applying insecticide to cattle.

Various applicators for applying insecticide to animals have been constructed; however, each of these has had certain inherent disadvantages. Some of them have been of relatively filmsy construction and are soon ruined and/or torn down by the cattle passing under them. Other types of applicators, which are more durable have the disavantage of not adequately applying the insecticide to all portions of the cattle, particularly to the sides and undersides, but merely apply it across their backs. Generally, the insecticide is carried in an oil base which is fed through an absorbent material in the applicator that acts as a wick to convey the oil from a supply tank to the body of the cattle. In most instances, the portions of the wick closest to the supply tank carries more insecticide than the other portions of the wick. Thus, an uneven application of the insecticide-carrying oil results.

Among the objects of this invention are to provide an applicator for applying insecticide to cattle; to provide such an applicator which is of simple construction, yet efficient in operation; to provide such an applicator which applies insecticide to the back, sides and undersides of cattle with equal facility; to provide such an applicator in which the insecticide is fed evenly to all portions thereof; to provide such an applicator wherein a wick extends centrally thereof, thereby transmitting an equal amount of insecticide to each end of the applicator; to provide such an applicator for applying insecticide to cattle which has wipers depending from the ends thereof for engaging the sides and undersides of the cattle; to provide such an applicator in which the wipers curve inwardly under the cattle as they walk under the applicator to assure application of insecticide oil to the sides and undersides thereof; and to provide such an applicator utilizing tubing lined with absorbent material for transmitting the insecticide oil from a suitable source of supply to the wipers for assuring even application to the cattle.

Additional objects and novel features of this invention will become apparent from the description which follows, taken in conjunction with the drawings in which.

Figure 1:
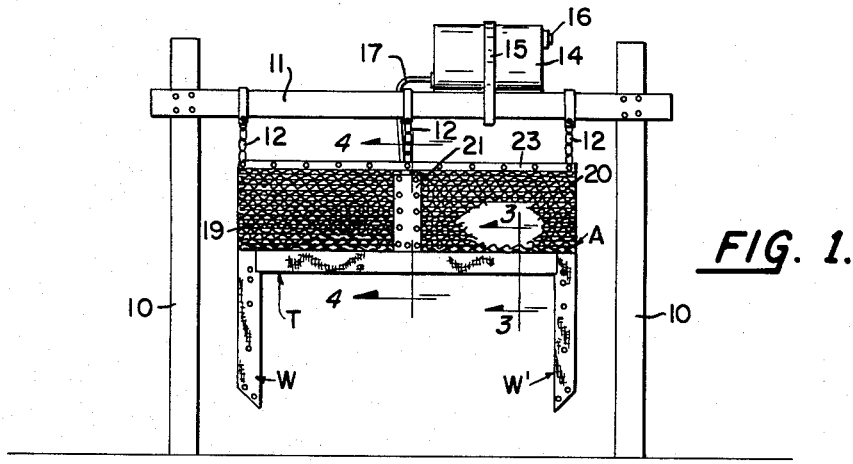
FIG. 1 is a side elevation of the novel insecticide applicator of this invention.

In accordance with this invention, an applicator A is provided for applying insecticide to cattle which may be supported between a pair of spaced, vertical posts 10 from horizontal cross bars 11 extending therebetween. Conveniently, cross bars 11 are attached to posts 10, as by nailing, and applicator A may be supported from either or both of them by means of a plurality of spaced chains 12, such as three, connected to spaced brackets 13 extending around cross bar 11. Conveniently, the insecticide which is carried in an oil base may be supplied from a drum 14 which is supported between cross bars 11 and held in place by a strap 15 extending around the drum and the cross bars, as shown. Advantageously, the drum may be filled through a cap 16 located at one end thereof and is discharged through a tube 17 extending from the other end thereof which feeds the insecticide oil into the applicator in a manner to be described.

Figure 2:
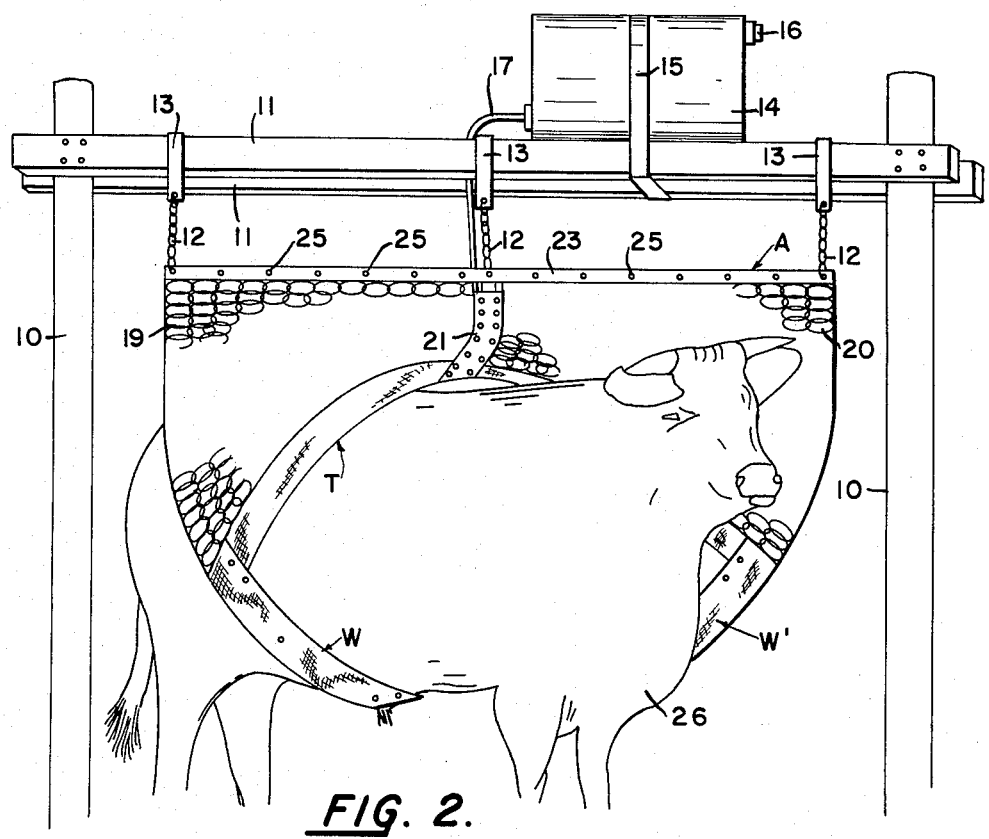
FIG. 2 is an enlarged, side elevation of the insecticide applicator of FIG. 1, showing the same in use.
Figure 4:
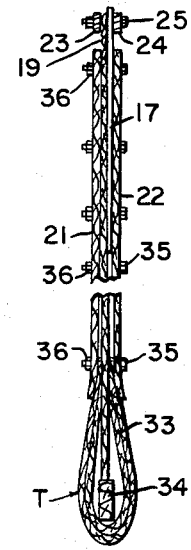
FIG. 4 is an enlarged, fragmentary, vertical section, taken along line 4—4 of FIG. 1, showing the manner in which the insecticide is fed into the applicator.

Briefly, applicator A comprises a pair of horizontally spaced screen sections 19 and 20 which are joined together along adjacent spaced edges by cloth webbing strips 21 and 22, as seen in FIG. 4. Screen sections 19 and 20 are supported along their upper edges between a pair of spaced metal strips 23 and 24, such as galvanized steel, held together by spaced bolts 25. Conveniently, chains 12 are attached to outer bolts 25 and a center bolt 25 which is positioned above webbing 21 and 22. The insecticide is fed down between webbing 21 and 22 by feed tube 17 to a horizontal section of tubing T, made of an absorbent cloth material, which extends along the bottom edge of the screens 19 and 20. Conveniently, the applicator is hung at a strategic height so that the tubing will engage the backs of cattle and apply the insecticide oil to their backs as they walk under the applicator. Also, the insecticide will be transmitted to a pair of wipers W and W' extending downwardly from opposite ends of tubing T which are adapted to curve upwardly under the animal, such as steer 26 of FIG. 2, walking under the applicator. Thus, the insecticide oil which flows down through the wipers will be applied to the sides and undersides of an animal passing under the applicator. It will be noted that a steer 26 will cause the center of the applicator to be raised so that tubing T curves across the back, and this in turn, due to applicant's novel construction, causes the wipers to curve inwardly under the body of the animal, thereby assuring an even and thorough application to all parts of the animal's body, including the upper portions of the legs.

Figure 3:
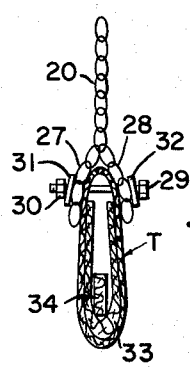
FIG. 3 is an enlarged, fragmentary vertical section, taken along line 3—3 of FIG. 1, showing a connection between the lower edge of the screen and the tubing.
Figure 5:
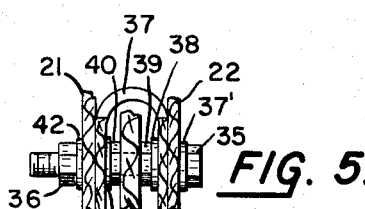
FIG. 5 is an enlarged, fragmentary, vertical section, taken along line 5—5 of FIG. 6, showing the connection between the bottom edge of the webbing and the tubing.
Figure 6:
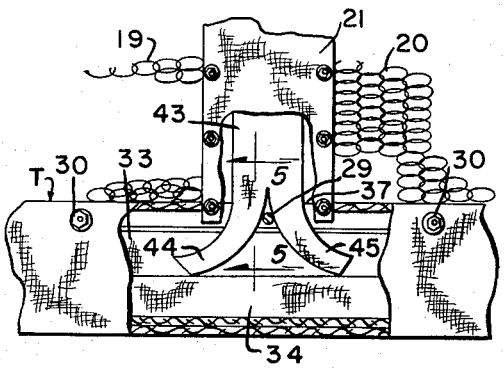
FIG. 6 is an enlarged, fragmentary, side elevation of the junction between the webbing and tubing, with parts broken away for clarity of illustration.

Conveniently, the screen sections 19 and 20 are made up of a plurality of horizontally extending coil springs which are interwound in the manner of ordinary fireplace screen. To form a means for attaching tubing T to the screen sections, a short screen segment is attached adjacent the lower end of each section 19 and 20. Thus, in FIG. 3, a lower segment 27, which is advantageously made up of four coil springs, is attached to the lower end of section 20 by threading the upper coil spring of segment 27 in the bottom coil spring of section 20. Similarly, a rear screen segment 28 also is attached to the lower end of screen section 20. Of course, it will be understood that similar segments are attached in similar manner to the bottom of screen section 19. Tubing T may then be received between front and rear segments 27 and 28, respectively, and held in place by a plurality of spaced bolts 29 which extends through the screen segments and tubing, as shown in FIG. 3, and are held in place by nuts 30. Conveniently, washers 31 and 32 are provided adjacent nuts 30 and the head of bolts 29 to prevent them from pulling through the screen. Tubing T is lined with a folded strip 33, as shown in FIGS. 3, 4 and 6, made of absorbent material, such as felt, which receives a wick 34, such as a felt strip, for conveying the insecticide oil through the tubing. Advantageously, webbing 21 and 22 is attached to screen sections 19 and 20 by bolts 35 which extend through the webbing and the screen and are held in place by nuts 36 and the webbing extends down through slit 37 into tubing T. Bolts 35 are each provided with a washer 37' adjacent the head so that it will not pull through webbing 22, as shown in FIG. 5, and washer 38 is held against the inside of tubing T by a nut 39 threadably received on bolt 35, while another nut 40 holds a washer 41 against the opposite side of tubing T and a washer 42 is provided against webbing 21 to prevent nut 36 from pulling through the webbing. A wick 43 is attached to webbing 21, as by staples (not shown), and tube 17 from drum 14 extends down between wick 43 and webbing 22, so that the insecticide flows from tube 17 onto the wick. Of course, wick 43 could be attached to webbing 22, if desired, or a wick could be attached to both webbing 21 and 22, if desired. Conveniently, wick 43 has split ends 44 and 45 which extend through slit 37 and around the lower bolt 29, as shown in FIGS. 5 and 6, for engagement with wick 34 in tubing T so that the insecticide oil is transmitted from wick 43 to wick 34 and may flow therealong. The oil absorbed by wick 34 will also pass through tubing T to be applied to the cattle since their backs will come in contact with tubing T when they walk under the applicator.

Figure 7:
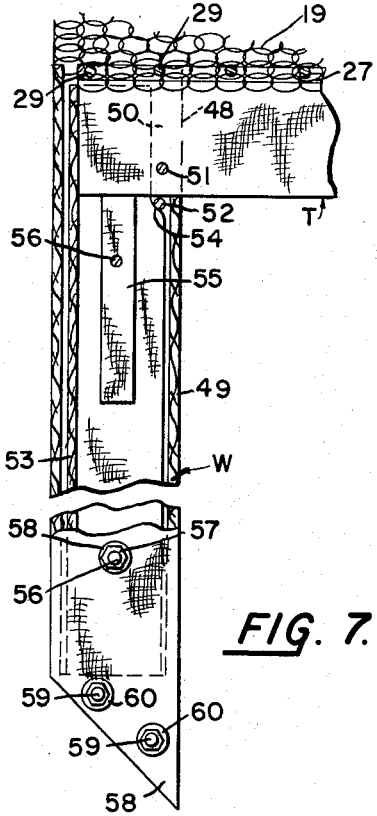
FIG. 7 is an enlarged, fragmentary side elevation of a wiper of the applicator of FIG. 1, with parts broken away for clarity of illustration.

Advantageously, the ends of tubing T extend into wicks W and W', such as through a slot 48 at the end of tube 49 which forms the outer cover of wiper W, as in FIG. 7. Conveniently, tube 49 may be made of the same absorbent cloth material and be of substantially the same size as tubing T. Slot 48 is formed by cutting a longitudinal slit at the end of tube 49 and folding it back to form an edge 50. The wiper is attached to tubing T by a bolt 51 extending through the tubing and edge 50, as shown, and this edge is prevented from unraveling or coming out by a second bolt 52 extending through tube 49 below tubing T, as illustrated in FIG. 7. Conveniently, tube 49 is provided with a folded absorbent lining 53, such as felt, extending from the upper end of tube 49 to a point adjacent the lower end thereof. The upper edge of liner 53 is trimmed to form a recess 54 so that bolts 51 and 52 will not pass through lining 53. A wick 55, which may conveniently be made of an absorbent material such as felt, extends through the center of wiper W from the upper end thereof downwardly about half the distance to the bottom and is held in place by spaced bolts 56 extending therethrough, as shown, which are held in place by nuts bearing against washers 58. Wick 55 does not extend clear to the bottom of wiper W to reduce the weight of the wipers since they become quite heavy when soaked with insecticide oil, which would tend to prevent the wipers from moving inwardly around the body of the cattle walking under the applicator A. Liner 53 is additionally held in place by means of a second bolt 56 which extends through a lower portion thereof. The bottom of tube 49 is folded to form a pointed end 58 with the folded ends held in place by a pair of diagonally-spaced bolts 59. Conveniently, bolts 59 are provided with washers 60 to prevent them from being pulled through the tube 49. It will be noted that tube 49 is folded so that the point is adjacent the inner edge thereof so that it will contact the undersides of the cattle as they walk under the applicator so that the insecticide oil will be applied directly to the cattle and not be lost by dripping onto the ground.

From the foregoing, it will be readily apparent that an insecticide applicator constructed in accordance with this invention fulfills to a marked degree the requirements and objects hereinbefore set forth. The applicator is of simple construction yet highly efficient in operation. This applicator will apply insecticide oil to the back, sides and undersides of cattle walking thereunder affording uniform application to all parts of the animal's body including the upper portion of the legs. This is accomplished by means of wipers, depending from the sides of the applicator which swing inwardly when the animal walks under the applicator to apply insecticide to the sides and undersides of the animal. The insecticide oil is fed centrally through a wick to the tubing to assure equal distribution of the oil to all parts of the applicator and hence to the animal. The novel wipers have wicks which only extend about half the length thereof to reduce weight and to facilitate the inward movement of the wipers around the body of the animal when it walks under the applicator.

Although a preferred embodiment of this invention has been illustrated and described, it will be understood that various changes and variations may be made without departing from the spirit and scope of this invention.

What is claimed is:

1. An applicator for applying insecticide to animals, including a rectangular body having an upper and lower border; means attached to said upper border for supporting said body so that said lower border is horizontally disposed and spaced above the ground so as to be engaged and lifted upwardly at the center by the backs of said animals passing thereunder; wick means within said lower border and extending therealong for applying insecticide to the backs of said animals; means communicating with said wick means intermediate the ends thereof for supplying insecticide thereto; a pair of wipers depending from said lower border and spaced a substantially equal distance on opposite sides of said insecticide supplying means and are separated a distance substantially equal to the width of the back of said animals; a wick in at least the upper portion of each said wiper in communication with said border wick means for supplying insecticide to said wipers and so that said lower ends will move inwardly and engage the sides and undersides of said animal upon the upward movement of the center of said lower border for uniformly applying insecticide thereto as said animals walk under said applicator.

2. An applicator for applying insecticide to animals, as set forth in claim 1, wherein each said wiper terminates in a pointed end adjacent the inner edge of said wiper adapted to engage the undersides of animals passing under said applicator.

3. An applicator for applying insecticide to animals, as set forth in claim 1, wherein said body includes a pair of screen sections having laterally spaced adjacent edges; a pair of laterally spaced vertical webbing strips; a plurality of spaced bolts extending through the edges of said strips and said screen sections for connecting said screen sections together; and a generally vertical wick extending between said webbing strips and attached to one of said webbing strips for supplying insecticide to said lower border wick.

4. An applicator for applying insecticide to animals, as set forth in claim 1, wherein said wiper wicks are spaced from the bottom of said wipers to reduce the weight of the wipers so that said lower ends thereof will move inwardly more easily to engage the sides and undersides of animals walking under the applicator.

5. An applicator for applying insecticide to animals, as set forth in claim 3, wherein said lower border includes tubing attached along the lower border of said screen sections and having a slit between said adjacent edges of said screen sections through which said webbing strips and said wick extend.

6. An applicator for applying insecticide to animals, as set forth in claim 5, wherein the lower border of each said screen section is bifurcated, said tubing extending into each said bifurcation; bolts extending through said bifurcations and said tubing for attaching said tubing to said screen sections.

7. An applicator for applying insecticide to animals, as set forth in claim 6, wherein the lower end of said wick is split to form tails passing on opposite sides of one of said bolts; and wherein said wick means includes a wick within said tubing and in engagement with said tails so that said insecticide is transmitted from said vertical wick to said tubing wick.

8. An applicator for applying insecticide to animals, as set forth in claim 7, including a folded felt strip in said tubing and extending around the bottom and sides of said tubing wick.

9. An applicator for applying insecticide to animals, as set forth in claim 5, including a longitudinal slit cut in the upper end of each said wiper, the edges of said slit being folded into said wiper and receiving the ends of said tubing; and means connecting said wipers to said tubing and extending through said edges.

10. An applicator for applying insecticide to animals, as set forth in claim 9, including a lining in said wick at least partially encircling said wiper wick; and a notch in said lining adjacent said edges; said connecting means including a first bolt extending through said tubing and said wipers adjacent said notch and a second bolt extending through said wiper below said tubing.

References Cited in the file of this patent

UNITED STATES PATENTS

| | | |
|---|---|---|
| 2,804,047 | Rogers | Aug. 27, 1957 |
| 2,825,305 | Tatge | Mar. 4, 1958 |
| 2,946,310 | Rogers | July 26, 1960 |
| 3,079,893 | Francisco | Mar. 5, 1963 |